(12) United States Patent
Nakanishi et al.

(10) Patent No.: US 7,246,049 B2
(45) Date of Patent: Jul. 17, 2007

(54) ANALYSIS METHOD AND SYSTEM OF LAMP MEMBER FOR VEHICLE

(75) Inventors: Akio Nakanishi, Shimizu (JP); Yoshinori Otsuka, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 743 days.

(21) Appl. No.: 10/391,818

(22) Filed: Mar. 20, 2003

(65) Prior Publication Data

US 2003/0179582 A1    Sep. 25, 2003

(30) Foreign Application Priority Data

Mar. 20, 2002   (JP)   ............................ P2002-079351

(51) Int. Cl.
 G06F 7/60 (2006.01)
 G06F 17/10 (2006.01)
 G06F 15/00 (2006.01)
 G06F 17/00 (2006.01)
 G06G 7/48 (2006.01)

(52) U.S. Cl. ................. 703/8; 703/2; 715/502

(58) Field of Classification Search ............... 703/2, 703/8; 715/502, 964; 382/113; 73/804; 345/621

See application file for complete search history.

(56) References Cited

U.S. PATENT DOCUMENTS 5,675,495 A   10/1997  Biermann et al.
5,940,308 A * 8/1999  Ishikawa et al. ............... 703/8
6,256,038 B1 * 7/2001  Krishnamurthy ............ 345/419

FOREIGN PATENT DOCUMENTS

JP      8-166979      6/1996
JP      2000-90715    3/2000

OTHER PUBLICATIONS

William I. Moore, Christopher R. Powers, "Utilizing CFD for Thermal Analysis of a Prototype HID Fog Lamp". Society of Automotive Engineers, 2000 pp. 1-6.*

* cited by examiner

*Primary Examiner*—Paul Rodriguez
*Assistant Examiner*—Dwin McTaggart Craig
(74) *Attorney, Agent, or Firm*—Sughrue Mion, PLLC

(57) ABSTRACT

An analysis method of a lamp member for a vehicle, includes (1) the point group data generation step of generating point group data that represents a region to be analyzed, on the basis of CAD data of a lamp member for a vehicle, (2) the analysis parameter extraction step of extracting analysis parameters required for analysis from a storage device, (3) the analysis parameter accept step of accepting input of the analysis parameters, and (4) the analysis execution step of executing analysis in accordance with a program corresponding to a structure of the lamp member for a vehicle on the basis of the generated point group data, and the accepted analysis parameters.

14 Claims, 8 Drawing Sheets

ANALYSIS METHOD AND SYSTEM OF LAMP MEMBER FOR VEHICLE

BACKGROUND OF THE INVENTION

1. Field of the Invention

The present invention relates to an analysis method and system of a lamp member for a vehicle using a computer.

2. Related Background Art

Conventionally, upon executing thermal analysis of a lamp member for a vehicle on a computer, a skilled person simplifies CAD data by himself or herself via various steps so as to be able to use the CAD data in analysis, specifies meshes to form a mesh model, and gives analysis parameters to the mesh model, thus executing analysis.

SUMMARY OF THE INVENTION

The present inventors found the following problems as a result of examining the aforementioned prior art. That is, in the conventional method, since a very large number of steps are required until a mesh model used in analysis is formed from CAD data, analysis takes much time. The setup of analysis parameters influences analysis precision. However, since it is difficult even for a skilled person to set up analysis parameters, if an unskilled person makes analysis, that difficulty increases, resulting in drops of the analysis speed and precision.

The present invention has been made to solve the aforementioned problems, and has as its object to provide an analysis method and system of a lamp member for a vehicle, which allow even an unskilled person to conduct precise, quick analysis.

An analysis method of a lamp member for a vehicle according to the present invention, comprises (1) the point group data generation step of generating point group data that represents a region to be analyzed, on the basis of CAD data of a lamp member for a vehicle, (2) the analysis parameter extraction step of extracting analysis parameters required for analysis from a storage device, (3) the analysis parameter accept step of accepting input of the analysis parameters, and (4) the analysis execution step of executing analysis in accordance with a program corresponding to a structure of the lamp member for a vehicle, on the basis of the generated point group data and the accepted analysis parameters.

With this method, point group data which represents a region to be analyzed is generated based on CAD data, and can be used as data for an analysis model. Therefore, compared to the conventional method in which a skilled person simplifies CAD data via various steps, easy and quick simplification can be made. Since analysis parameters are extracted from the storage device, when a skilled person pre-stores optimal parameters in the storage device, even an unskilled person can conduct precise analysis using the analysis parameters. Furthermore, since analysis can be made according to a program corresponding to the structure of the lamp member for a vehicle, analysis with higher precision can be attained.

The analysis method of a lamp member for a vehicle according to the present invention can further comprise the analysis parameter display step of displaying the analysis parameters extracted from the storage device. In this way, the analysis parameters to be used can be confirmed.

In the analysis method of a lamp member for a vehicle according to the present invention, the analysis parameter accept step can accept the analysis parameters displayed in the analysis parameter display step, or analysis parameters corrected on the basis of the displayed analysis parameters. In this manner, the analysis parameters can be corrected if necessary. Since this correction can be made based on the displayed analysis parameter, high analysis precision can be maintained. Furthermore, since the analysis parameters can be corrected easily, a plurality of plans can be easily examined by obtaining a plurality of analysis results using different analysis parameters.

The analysis method of a lamp member for a vehicle according to the present invention can further comprise the result display step of displaying an analysis result. In this manner, the analysis result can be confirmed.

The analysis method of a lamp member for a vehicle according to the present invention is suitable for making thermal analysis as analysis of the lamp member for a vehicle.

An analysis system of a lamp member for a vehicle according to the present invention, comprises (1) point group data generation means for generating point group data that represents a region to be analyzed, on the basis of CAD data of a lamp member for a vehicle, (2) analysis parameter extraction means for extracting analysis parameters required for analysis from a storage device, (3) analysis parameter accept means for accepting input of the analysis parameters, and (4) analysis execution means for executing analysis in accordance with a program corresponding to a structure of the lamp member for a vehicle, on the basis of the generated point group data and the accepted analysis parameters.

The analysis system of a lamp member for a vehicle according to the present invention can further comprises analysis parameter display means for displaying the analysis parameters extracted from the storage device.

In the analysis system of a lamp member for a vehicle according to the present invention, the analysis parameter accept means can accept the analysis parameters displayed by the analysis parameter display means, or analysis parameters corrected on the basis of the displayed analysis parameters.

The analysis system of a lamp member for a vehicle according to the present invention can further comprise result display means for displaying an analysis result.

The analysis system of a lamp member for a vehicle according to the present invention is suitable for making thermal analysis as analysis of the lamp member for a vehicle.

The present invention will be understood more sufficiently by way of the following detailed description and the accompanying drawings. However, these are presented merely for an exemplification purpose, and do not limit the present invention.

DETAILED DESCRIPTION OF THE PREFERRED EMBODIMENTS

Figure 1:
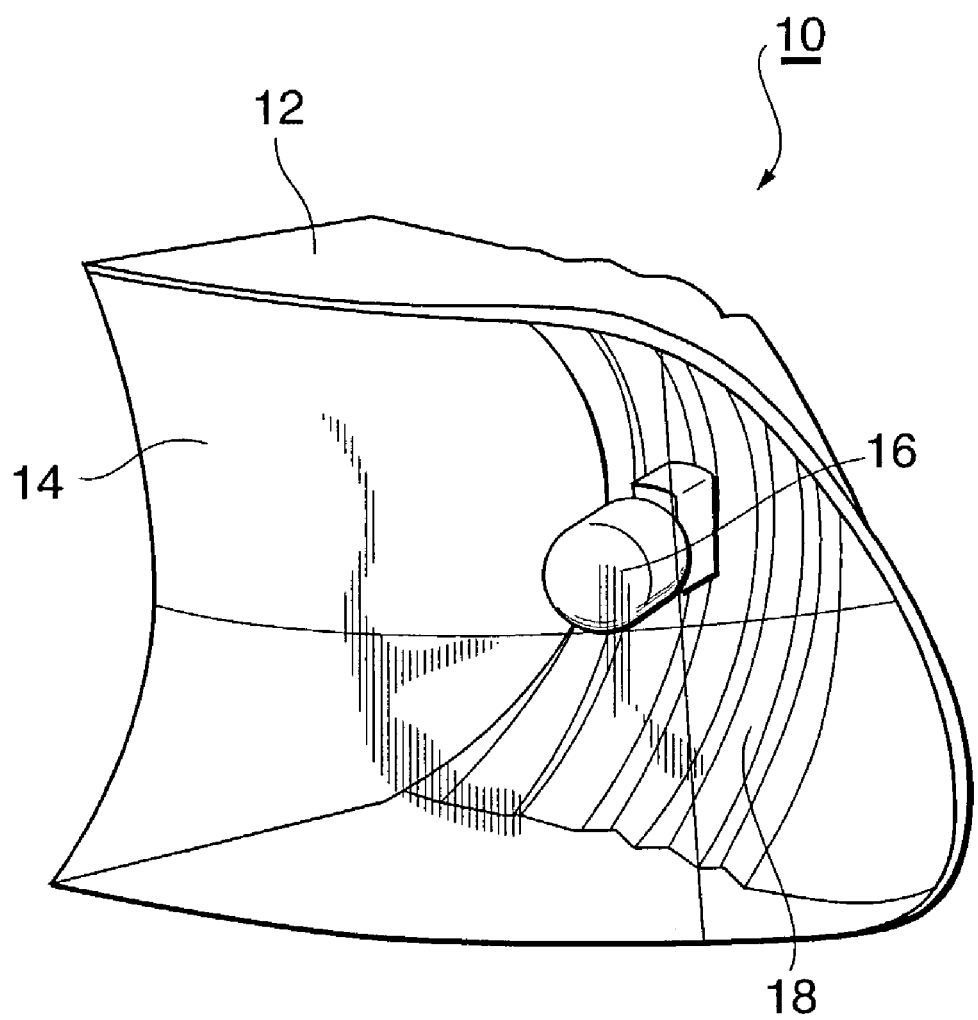
FIG. 1 is a perspective view showing the arrangement of a lamp member for a vehicle.

Preferred embodiments of the present invention will be described in detail hereinafter with reference to the accompanying drawings. Note that the same reference numerals denote the same elements throughout the description of the drawings, and a repetitive description thereof will be omitted. Also, the dimensional ratio of the drawings does not always match that in the description.

Figure 2:
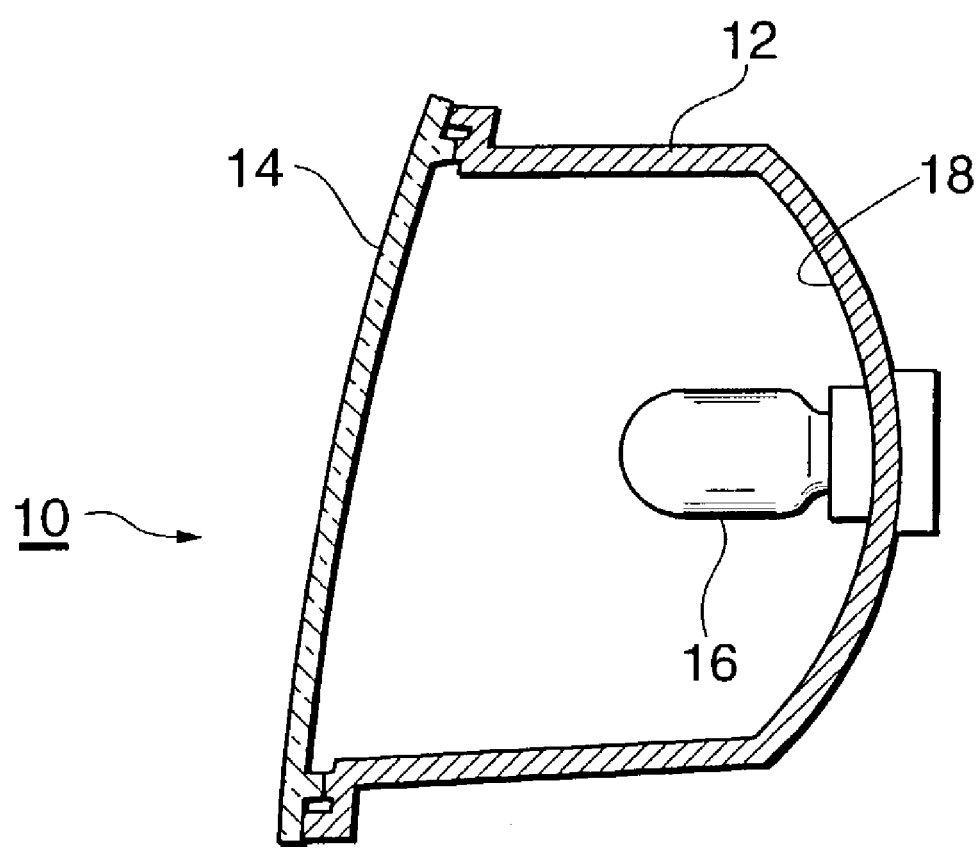
FIG. 2 is a sectional view of the lamp member for a vehicle shown in FIG. 1.

This lamp member 10 for a vehicle is applied to, e.g., a marker lamp such as a tail lamp of an automobile, and comprises a body 12, lens 14, and light source bulb 16, as shown in FIGS. 1 and 2. The inner surface of the body 12 is deposited with aluminum, and serves as a reflector 18 that reflects light coming from the light source bulb 16.

An analysis method and system of a lamp member for a vehicle according to the present invention are used to analyze the characteristics of the lamp member for a vehicle with the above arrangement on a computer. A practical embodiment of the method and system will be explained below.

Figure 3:
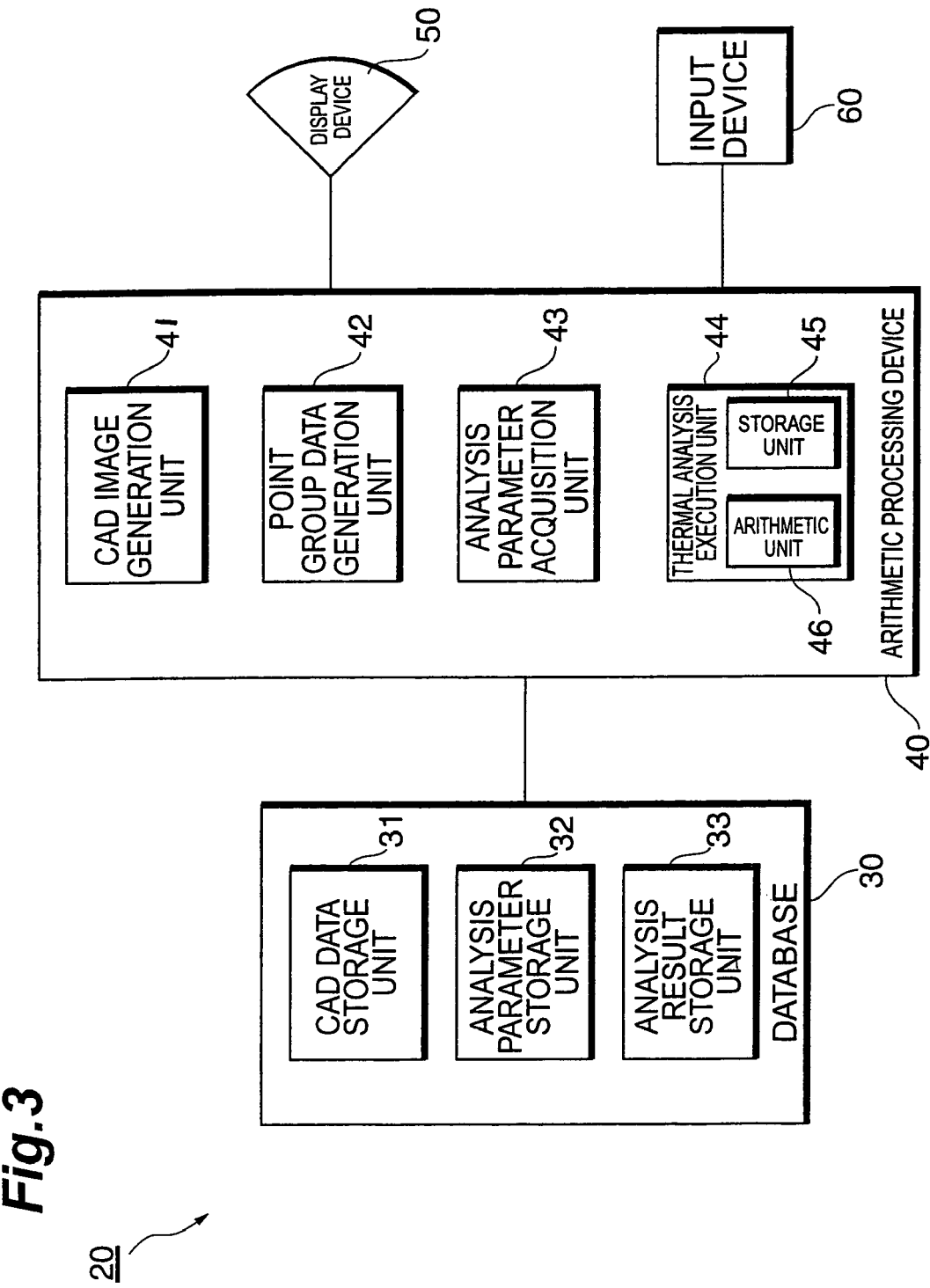
FIG. 3 is a block diagram showing the arrangement of a thermal analysis system according to an embodiment of the present invention.

FIG. 3 is a block diagram showing the arrangement of a thermal analysis system of a lamp member for a vehicle according to this embodiment. As shown in FIG. 3, a thermal analysis system 20 comprises a database 30 that stores various data, an arithmetic processing device 40 which makes various arithmetic processes, a display device 50, and an input device 60.

The database 30 has a CAD data storage unit 31 for storing CAD data of a lamp member for a vehicle (to be also simply referred to as a lamp member hereinafter), an analysis parameter storage unit (storage device) 32 for storing analysis parameters required for thermal analysis, and an analysis result storage unit 33 for storing a thermal analysis result.

The CAD data storage unit 31 stores CAD data of a plurality of lamp members, which are classified in correspondence with structures. The analysis parameter storage unit 32 stores analysis parameters that pertain to the shapes of lamp members, analysis parameters that pertain to attributes of components which form lamp members, analysis parameters that pertain to the specifications, and analysis parameters that pertain to modeling. The analysis parameters that pertain to the shapes include a body pull-out direction, optical axis direction of a lamp, light source bulb attachment direction, filament direction, and the like. The parameters that pertain to attributes include a lens thickness, lens material, lens heat conductivity, lens color, body thickness, body material, body heat conductivity, reflector surface treatment, and the like. The analysis parameters that pertain to specifications include an operating condition, lighting voltage, ambient temperature, the presence/absence of an air blast, and the like. The analysis parameters that pertain to modeling include mesh coarseness and the like. These analysis parameters are optimal parameters which are generated and stored in advance by a skilled person to allow thermal analysis of lamp members with various structures.

The analysis result storage unit 33 stores thermal analysis results for a plurality of lamp members.

The arithmetic processing device 40 has a CAD image generation unit 41, point group data generation unit (point group data generation means) 42, analysis parameter acquisition unit (analysis parameter extraction means, analysis parameter accept means) 43, and thermal analysis execution unit (thermal analysis execution means) 44.

The CAD image generation unit 41 generates a three-dimensional (3D) CAD image of a lamp member on the basis of CAD data of the lamp member read out from the CAD data storage unit 31. The generation unit 41 then generates a signal for making the display device 50 display the generated 3D CAD image. Note that the 3D CAD image displayed on the display device 50 can be corrected based on information input from the input device 60, and the CAD image generation unit 41 corrects CAD data based on this correction information.

The point group data generation unit 42 automatically generates point group data that represents a region which is to undergo thermal analysis, on the basis of CAD data of a lamp member read out from the CAD data storage unit 31, or CAD data corrected by the CAD image generation unit 41. More specifically, the generation unit 42 picks up the body and lens inner surface from the CAD data to specify a closed space region which is to undergo thermal analysis, expresses the outer shape of this region by a plurality of points represented by 3D coordinates, and generates point group data formed by these plurality of points in a text file format.

The analysis parameter acquisition unit 43 automatically extracts analysis parameters required to make thermal analysis of that lamp member from the analysis parameter storage unit 32 of the database 30. The acquisition unit 43 then generates a signal for making the display device 50 display a display screen (see FIG. 7) used to display the extracted analysis parameters. This display screen displays the extracted analysis parameters as default values, and the analysis parameters displayed as default values can be corrected based on information input from the input device 60. Therefore, the analysis parameter 43 accepts, as analysis parameters, default parameter values if the analysis parameters are not corrected, or corrected parameter values if they are corrected, and acquires the analysis parameters in a text file format.

The thermal analysis execution unit 44 includes a storage unit 45 and arithmetic unit 46. The storage unit 45 stores a plurality of thermal analysis programs corresponding to the structures of lamp members. For example, a plurality of thermal analysis programs are stored in correspondence with structures which are finely classified (a marker lamp or head lamp, a single or composite structure, a direct projection or reflecting type in case of the marker lamp, and so forth). These programs are generated and stored in advance by a skilled person so as to allow thermal analysis of lamp members with various structures. The arithmetic unit 46 executes thermal analysis in accordance with an analysis program corresponding to the structure of a lamp member to be analyzed, on the basis of the point group data generated by the point group data generation unit 42, and the analysis parameters accepted by the analysis parameter acquisition unit 43. The arithmetic unit 46 then generates a signal for making the display device 50 display the thermal analysis result.

As the display device 50, for example, a CRT display, liquid crystal display, and the like can be used. As the input device 60, for example, a pointing device such as a mouse or the like, a keyboard, and the like can be used.

Figure 4:
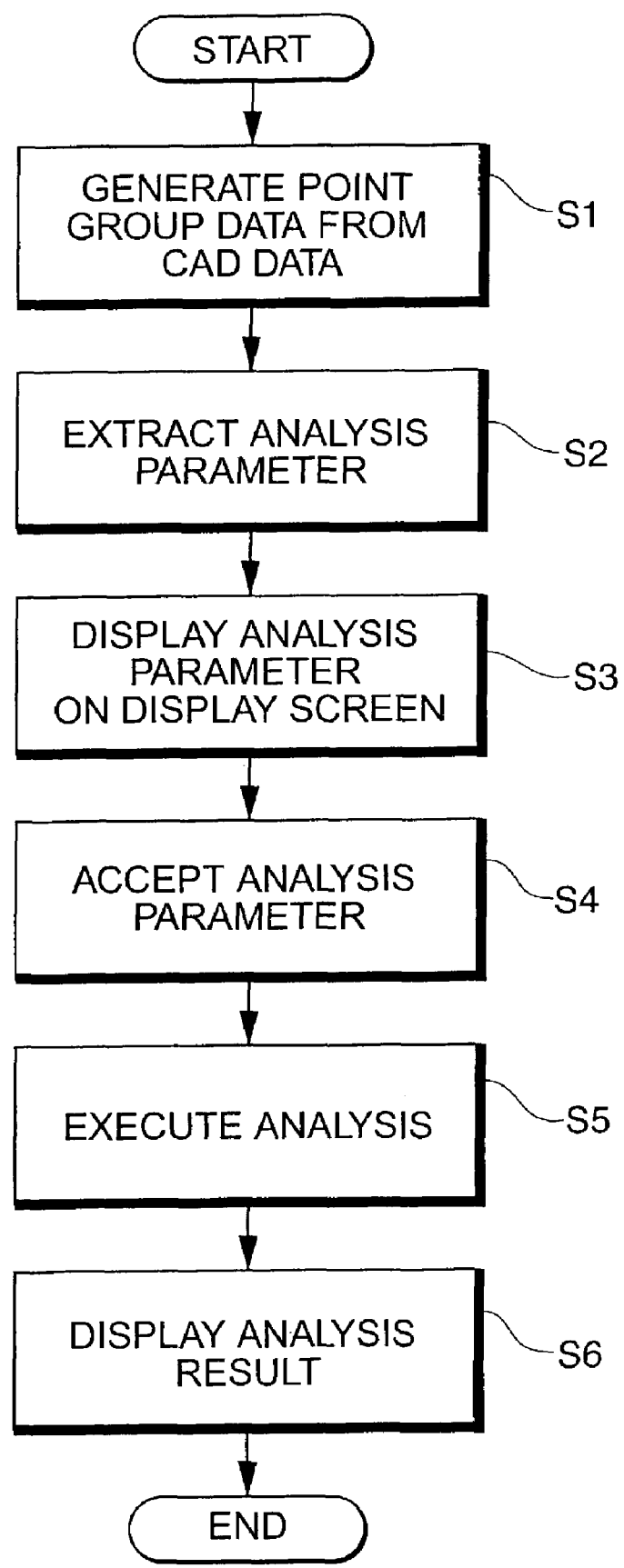
FIG. 4 is a flow chart showing a thermal analysis method according to the embodiment of the present invention.

A thermal analysis method according to this embodiment using the thermal analysis system 20 with the above arrangement will be described below with reference to the flow chart in FIG. 4.

Figure 5:
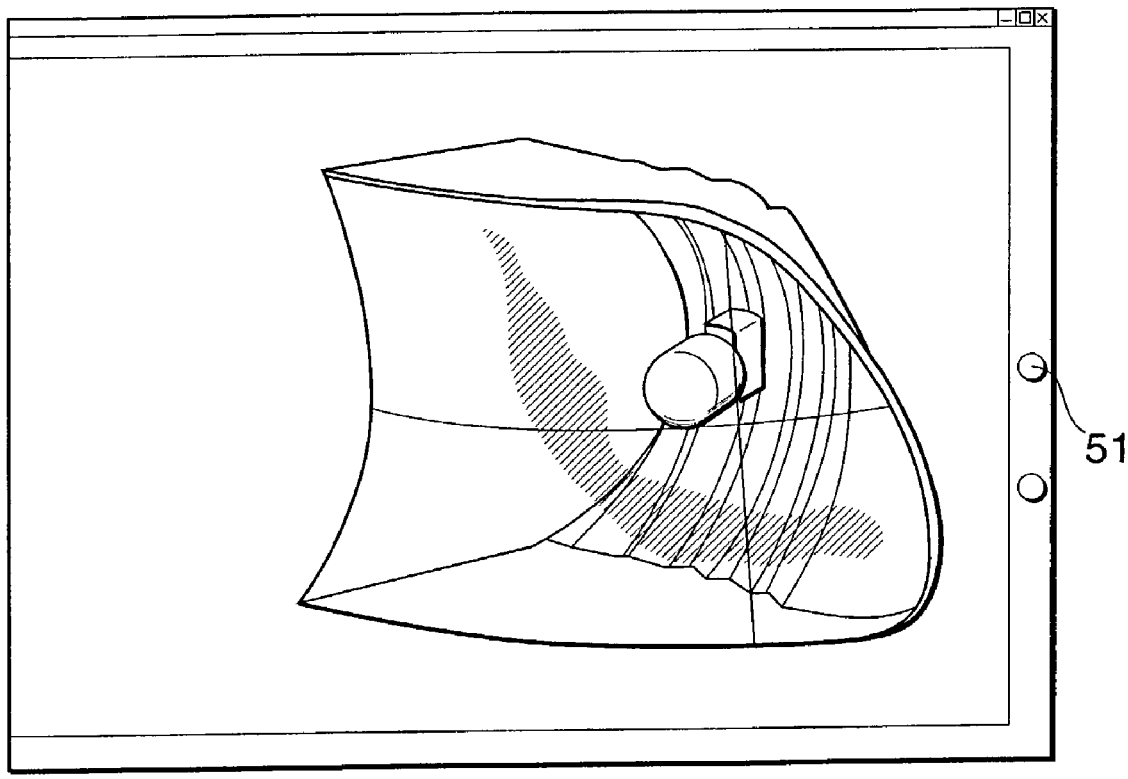
FIG. 5 shows a display state of a lamp member for a vehicle on the screen on the basis of CAD data.

The CAD image generation unit 41 reads out CAD data of one lamp member from the CAD data storage unit 31 on the basis of an instruction from a designer via the input device 60, and generates a 3D CAD image of that lamp member. The generation unit 41 generates a signal for making the display device 50 display the generated 3D CAD image, and the display device 50 displays the 3D CAD image of that lamp member on the basis of the generated signal, as shown in FIG. 5. At this time, the designer can correct the 3D CAD image displayed on the display device 50 via the input device 60, and the CAD image generation unit 41 corrects CAD data based on correction information input via the input device 60.

Figure 6:
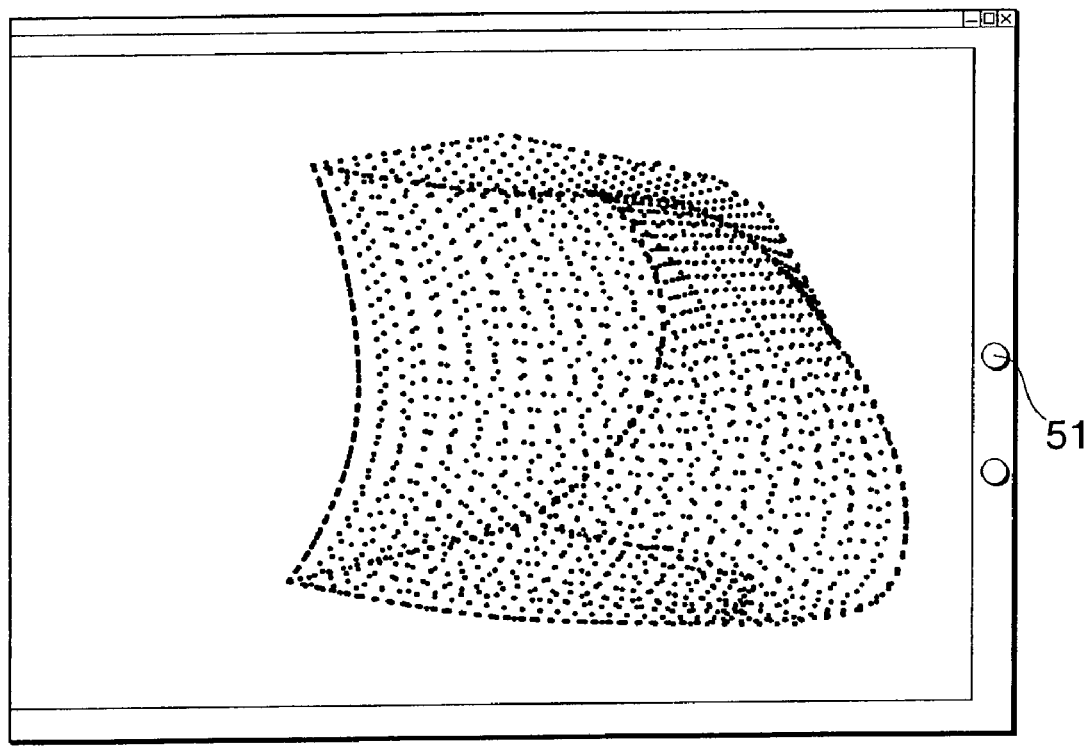
FIG. 6 shows a display state of point group data, which is generated based on CAD data, and represents the outer shape of a region which is to undergo thermal analysis, on the screen.

When the designer wants to start thermal analysis of the lamp member displayed on the display device 50, he or she clicks a thermal analysis start button 51 on the screen displayed on the display device 50 via the input device 60. Then, the point group data generation unit 42 generates point group data that represents a region which is to undergo thermal analysis, as shown in FIG. 6, on the basis of the CAD data of the lamp member read out from the CAD data storage unit 31, or the CAD data corrected by the CAD image generation unit 41. More specifically, the generation unit 42 picks up the body and lens inner surface from the CAD data to specify a closed space region which is to undergo thermal analysis, expresses the outer shape of this region by a plurality of points represented by 3D coordinates, and generates point group data formed by these plurality of points in a text file format (point group data generation step: step S1).

Figure 7:
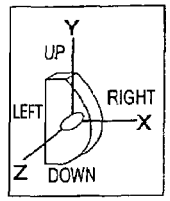
FIG. 7 shows a display window of analysis parameters.

At the same time, the analysis parameter acquisition unit 43 extracts analysis parameter required for thermal analysis from the analysis parameter storage unit 32 of the database 30 on the basis of a model number of that lamp member (analysis parameter extraction step: step S2). The acquisition unit 43 generates a signal for making the display device 50 display a display screen used to display the extracted analysis parameters, and the display device 50 displays the display screen on the basis of this signal, as shown in FIG. 7 (analysis parameter display step: step S3). As a result, the designer can confirm the analysis parameters. This display screen displays the analysis parameters extracted from the analysis parameter storage unit 32 as default values, and the analysis parameters displayed as default values can be corrected based on information input from the input device 60.

When the designer clicks an analysis execution button 52 on the display screen shown in FIG. 7, the analysis parameter acquisition unit 43 accepts, as analysis parameters, default parameter values if the analysis parameters are not corrected, or corrected parameter values if they are corrected, and acquires the analysis parameters in a text file format (analysis parameter accept step: step S4).

The thermal analysis execution unit 44 selects an analysis program corresponding to the structure of the lamp member from a plurality of programs stored in the storage unit 45. The arithmetic unit 46 executes thermal analysis in accordance with the selected program on the basis of the point group data generated by the point group generation unit 43, and the analysis parameters accepted by the analysis parameter acquisition unit (analysis execution step: step S5).

Figure 8:
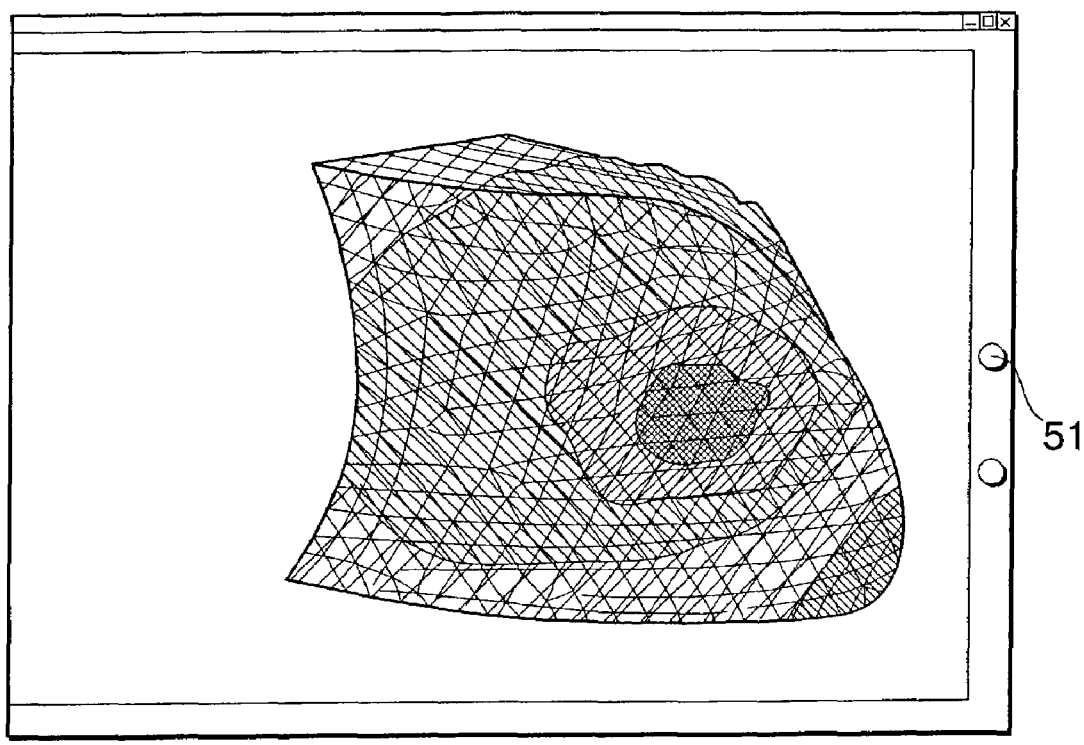
FIG. 8 shows a display state of the thermal analysis result on the screen.

The thermal analysis execution unit 44 expresses a temperature distribution as the thermal analysis result using, e.g., a density distribution of colors, and generates a signal for making the display device 50 display that distribution. The display device 50 displays the analysis result based on this signal, as shown in FIG. 8 (result display step: step S6). In this way, the designer can confirm the analysis result. The thermal analysis execution unit 44 saves the latest analysis result in the analysis result storage unit 33 in accordance with a designer's instruction.

The operations and effects of the thermal analysis method and system according to this embodiment will be described below.

In this embodiment, the point group data generation unit 42 automatically generates point group data which represents a region to be analyzed on the basis of CAD data of a given lamp member, and can use that data as analysis model data. Therefore, compared to the conventional method in which a skilled person simplifies CAD data via various steps, CAD data can be simplified easily and quickly. Since analysis parameters are extracted from the analysis parameter storage unit 32 of the database 30, if a skilled person pre-stores optimal parameters in the analysis parameter storage unit, even an unskilled person can easily make precise analysis using these analysis parameters. Furthermore, since analysis can be made in accordance with a program which is generated in advance by the skilled person and corresponds to the structure of the lamp member for a vehicle, analysis with higher precision can be attained. As a result, even a designer who is not skilled in analysis can easily make thermal analysis with high precision, and can correct CAD data for each analysis on the basis of the analysis result, thus shortening the lamp member development period.

In this embodiment, since the analysis parameter acquisition unit 43 can accept analysis parameters which are extracted from the analysis parameter storage unit 32 and are displayed on the display device 50, or analysis parameters which are corrected based on the displayed analysis parameters, the analysis parameters can be corrected if necessary. Since this correction can be made based on the analysis parameters displayed on the display device 50, high analysis precision can be maintained. Furthermore, since the analysis parameters can be corrected easily, a plurality of plans can be easily examined by obtaining a plurality of analysis results using different analysis parameters.

Note that the present invention is not limited to the aforementioned embodiment, and various changes and modifications may be made.

For example, the above embodiment has explained analysis of a marker lamp as the lamp member, but the present invention can be applied to analysis of lamp members with other structures such as a head lamp, and the like.

In the above embodiment, after analysis parameters extracted from the analysis parameter storage unit 32 are displayed on the display device 50, analysis is executed. However, if analysis parameters need not be confirmed or corrected, the analysis parameters extracted from the analysis parameter storage unit 32 may be directly accepted by the analysis parameter acquisition unit 43 to execute analysis.

In the above embodiment, thermal analysis of the lamp member is executed. However, the present invention can be applied to other analysis processes such as structural analysis and the like.

As described above, according to the present invention, there are provided an analysis method and system of a lamp member for a vehicle, which allow even an unskilled person to make precise and quick analysis.

As can be seen from the description of the present invention, the present invention can be variously modified. Such modifications are not recognized as those departing from the spirit and scope of the present invention, and improvements which are known to those who are skilled in the art are included in the scope of the appended claims.

What is claimed is:

1. An analysis method of a lamp member for a vehicle, comprising:
   generating point group data that represents a region to be analyzed, based on computer-aided design (CAD) data of a lamp member for a vehicle;
   extracting analysis parameters required for analysis from a storage device;
   accepting input of analysis parameters;
   executing analysis in accordance with a program corresponding to a structure of the lamp member for the vehicle, on the basis of the generated point group data and the accepted analysis parameters; and
   displaying an analysis result;
   wherein said analysis parameters comprises a lamp member shape information, a lamp member component attribute information, a lamp member specification information, and a lamp member modeling information; and
   wherein said lamp member specification information comprises at least one of an operating condition, a lighting voltage an ambient temperature, and an air blast information.

2. A method according to claim 1, further comprising displaying the analysis parameters extracted from the storage device.

3. A method according to claim 2, wherein the accepting the input of the analysis parameters comprises at least one of accepting the displayed analysis parameters and correcting analysis parameters based on the displayed analysis parameters.

4. A method according to claim 1, wherein thermal analysis is executed as analysis of the lamp member for the vehicle.

5. An analysis system of a lamp member for a vehicle, comprising:
   a point group data generator which generates point group data that represents a region to be analyzed from computer-aided design (CAD) data of a lamp member for a vehicle;
   an analysis parameter extractor which extracts analysis parameters required for analysis from a storage device;
   an analysis parameter accepter which accepts input of the analysis parameters;
   an analysis executor which executes analysis in accordance with a program corresponding to a structure of the lamp member for a vehicle, on the basis of the generated point group data and the accepted analysis parameters; and
   a result display which displays an analysis result;
   wherein said analysis parameters comprises a lamp member shape information, a lamp member component attribute information, a lamp member specification information, and a lamp member modeling information; and
   wherein said lamp member specification information comprises at least one of an operating condition, a lighting voltage, an ambient temperature, and an air blast information.

6. A system according to claim 5, further comprising analysis parameter display which displays the analysis parameters extracted from the storage device.

7. A system according to claim 6, wherein said analysis parameter accepter performs at least one of accepting the analysis parameters displayed by said analysis parameter display and correcting analysis parameters based on the displayed analysis parameters.

8. A system according to claim 5, wherein thermal analysis is executed as analysis of the lamp member for the vehicle.

9. The analysis method according to claim 1, wherein said analysis is performed on the lamp member comprising a body, a lens, a light source and a reflector, wherein analysis is performed on a closed space region of the lamp member.

10. The analysis method according to claims 1 or 6, wherein said lamp member shape information comprises at least one of a body pull-out direction, a lamp member optical axis direction, a light source bulb attachment direction, and a filament direction.

11. The analysis method according to claim 1 or 6, wherein said lamp member component attribute information comprises at least one of a lens thickness, a lens material, a lens heat conductivity, a lens color, a body thickness, a body material, a body heat conductivity, and a reflector surface treatment.

12. The analysis method according to claim 1, wherein said program comprises a thermal analysis program.

13. The analysis system according to claim 5, wherein said analysis executor comprises:
   an arithmetic unit which executes analysis according to the program; and
   a storage unit which stores the program.

14. The analysis system according to claim 5, further comprising a database, wherein said database comprises:
   a CAD data storage unit which stores CAD data of the lamp member;
   an analysis parameter storage unit which stores analysis parameters; and
   an analysis result storage unit which stores a result of the analysis.

* * * * *